United States Patent Office 3,050,561
Patented Aug. 21, 1962

3,050,561
PROCESS FOR PREPARATION OF
2-CYCLOHEXENONE
William F. Brill, Skillman, N.J., assignor to Petro-Tex Chemical Corporation, Houston, Tex., a corporation of Delaware
No Drawing. Filed Nov. 16, 1959, Ser. No. 853,012
5 Claims. (Cl. 260—586)

This invention relates to 2-cyclohexenone and relates more particularly to preparation of 2-cyclohexanone from 4-vinylcyclohexene hydroperoxide.

Cyclohexenones may be prepared by the dehydrogenation of cyclohexan-2-ol-1-ones, by the dehydrohalogenation of 2-halogenocyclohexan-1-ones, by the oxidation of cyclohexenes with chromium trioxide, selenium dioxide or oxygen, by cyclization of aliphatic 1,5-diketones based on acetoacetic acid and esters, and the like. All of these methods are complex, require the use of expensive and, in many cases, difficult to obtain intermediates, and do not result in good yield of 2-cyclohexenone.

I have found that 2-cyclohexenone, which has the formula

is readily obtained from 4-vinylcyclohexene hydroperoxide by acidic decomposition of the 4-vinylcyclohexene hydroperoxide. This novel process represents a novel and useful route for the preparation of 2-cyclohexenone.

The 2-cyclohexenone is derived from 4-vinylcyclohexene-4-hydroperoxide which, in turn, is derived from 4-vinylcyclohexene. 4-vinylcyclohexene is readily and inexpensively obtained as a by-product of butadiene production or is prepared by dimerizing butadiene-1,3 with heat in the presence of a polymerization inhibitor such as hydroquinone. 4-vinylcyclohexene-4-hydroperoxide

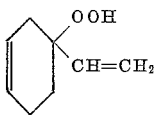

is easily prepared by passing oxygen through 4-vinylcyclohexene at temperatures in the range of about 50° C. to 90° C. 2-cyclohexenone is then obtained from the 4-vinylcyclohexene hydroperoxide by treating the separated and purified 4-vinylcyclohexene hydroperoxide under acidic conditions.

In the acid decomposition of 4-vinylcyclohexene hydroperoxide to form 2-cyclohexenone, any strongly acidic material may be employed in the reaction to provide the desired 2-cyclohexenone. For example, sulfuric acid, hydrochloric acid, nitric acid, perchloric acid, treatment with acidic ion-exchange resins, and, quite unexpectedly, silica-alumina of a type used in petroleum operations for catalytic reactions including cracking, reforming and the like. The acids employed are preferably strong acids which are considered as being highly ionized. Generally, strong mineral acids and organic acids having ionization constants $K_1$ at 25° C. of greater than about $1 \times 10^{-2}$, and more preferably greater than $1 \times 10^{-1}$, may be used. Very good results have been obtained with sulfuric and perchloric acids.

Normally, the desired acidic material is added to the 4-vinylcyclohexene hydroperoxide and the reaction mixture either heated, or allowed to stand for a sufficient period of time to cause the desired reaction. The acidic decomposition of the 4-vinylcyclohexene hydroperoxide, quite unexpectedly, is to acetaldehyde and 2-cyclohexenone. Normally, organic hydroperoxides decompose to an alcohol and a carbonyl compound. The amount of acid or acidic material employed will depend upon the degree and rate of conversion of hydroperoxide to ketone desired as will be obvious to the man skilled in the art. Normally an amount of acid greater than about 0.1 percent, based on the weight of 4-vinylcyclohexene hydroperoxide, will be employed. For example, one percent of perchloric acid is a satisfactory amount of highly ionized acid. Larger amounts of acid, of course, can be employed, if desired, but there is no necessity to use more than a sufficient amount which is readily determined by those skilled in the art. Large amounts of acid are not usually used since polymerization of the reactants may occur causing loss of the material. Another measure of the amount of acid used is the pH of the reaction mixture. A pH of less than about 1, obtained with acidic materials of the type described, is satisfactory. Of course, this value is only approximate for non-aqueous systems.

The following examples will illustrate processes for preparing 2-cyclohexenone from 4-vinylcyclohexene hydroperoxide.

4-vinylcyclohexene hydroperoxide was prepared by heating 0.4 mole of 4-vinylcyclohexene to about 70° C. and passing oxygen through the heated 4-vinylcyclohexene for a period of six hours. To this reaction mixture there was added 250 ml. of 10 percent sulfuric acid and the resulting mixture boiled for ten minutes. The mixture was then saturated with sodium sulfate and extracted with ether. The ether layer was separated, washed with water and dried over anhydrous potassium acetate and Drierite. After removal of the ether, fractionation of the dried product yielded 2-cyclohexenone of refractive index $n_D^{25}$ 1.4950. The 2-cyclohexenone was identified by means of its semicarbazone and 2,4-dinitrophenylhydrazone derivatives, and its ultra-violet spectra.

4-vinylcyclohexene hydroperoxide prepared by passing oxygen through 4-vinylcyclohexene at 50° C. was isolated by fractional distillation. A solution containing 0.1 mole (14.1 grams) of the 4-vinylcyclohexene hydroperoxide (76.8 percent-titrated) in 80 mls. of glacial acetic acid containing 0.16 ml. of 70 percent perchloric acid was allowed to stand overnight at room temperature. A slurry of 26 grams of sodium carbonate in 150 mls. of water was then added dropwise to the reaction mixture and the gas evolved passed through a saturated solution of 2,4-dinitrophenylhydrazone in 2 N hydrochloric acid. The precipitate formed was identified as acetaldehyde 2,4-dinitrophenylhydrazone by a mixed melting point determination. The decomposition mixture was extracted with ether and the ether washed with sodium bicarbonate and water and dried. Distillation through a Vigreaux column gave 5.1 g. of the ketone 2-cyclohexenone at 64–70°/4mm., having a refractive index of $n_D^{20}$ 1.4814. The infra-red spectra of the distillate showed the expected bands at 6.0 mu and 6.1 mu. Absorption due to hydroxyl, vinyl unsaturation or aldehyde carbonyl (C—H stretching) was absent. The ultra violet spectra showed the literature reported maxima, 225 mu for 2-cyclohexenone. The semicarbazone melted at 161–162° C. (reported M.P. 161°, 163°) after one recrystallization from water. 2,4-dinitrophenylhydrazone recrystallized several times from alcohol yielded cerise crystals melting at 180–181°, when heated rapidly. An authenic sample of 2-cyclohexenone prepared by oxidizing cyclohexene yielded a derivative whose melting point was not depressed by admixture with the decomposition product derivative. Both 2,4-dinitrophenylhydrazones showed maxima in the ultra violet at 377 mu (E=21,000), 285 mu and 250 mu, and a minimum at 310 mu. Fractionation of the 2-cyclohexenone, from a similar experiment, through a spinning band column gave a fraction at 41° C./1 mm. of refractive index $n_D^{25}$ 1.4950, which also had a carbonyl equivalent weight of 99 (calculated for cyclohexenone-96) by hydroxylamine titration. The recovered 2-cyclohexenone is readily converted to cyclohexanone by hydrogenation.

The 2-cyclohexenone is also obtained by treating 4-vinylcyclohexene hydroperoxide with acid treated cation exchange resins. For example, samples of 4-vinylcyclohexene containing 10 percent 4-vinylcyclohexene hydroperoxide were mixed with several acid treated cation exchange resins, which resins had been treated with 10 percent perchloric acid in acetic acid, prior to use, and the percent of 4-vinylcyclohexene hydroperoxide destroyed was determined. Amberlite, a phenolic methylene sulfonic acid resin, destroyed 65 percent of the peroxide in 2 hours at 20° C., Dowex-50 destroyed 61 percent of the peroxide in 2 hours at 20° C., and Permutit Q decomposed 100 percent of the peroxide in 2 hours at 20° C. Both of these two resins are the nuclear sulfonic acid types and are believed to be sulfonated copolymers of styrene with small amounts of divinylbenzene for crosslinking purposes. Similar results were obtained when these resins were pretreated with 10 percent sulfuric acid. A cracking silica-alumina catalyst in pellet form containing from about 70 to 95 percent silica and 5 to 30 percent alumina decomposed 53 percent of the 4-vinylcyclohexene hydroperoxide in 22 hours at 40°. This technique for obtaining 2-cyclohexenone from 4-vinylcyclohexene hydroperoxide is also effected by passing a solution of 4-vinylcyclohexene hydroperoxide over a bed or column of the acid treated cation exchange resins. Any of the known acidic cation exchange resins are effective for this purpose.

2-cyclohexenone is readily converted to 2-cyclohexanone by catalytic hydrogenation or sodium-alcohol reduction. The useful cyclohexenols are obtained through use of the Ponndorf reduction. The dicyclohexyl derivatives are obtained from 2-cyclohexenone by reduction with sodium amalgam in acid solution. Another useful series of reactions based on 2-cyclohexenone is reaction with hydroxylamine to first form the oxime and further reaction to form a hydroxylamino-oxime. In acid media the oxime undergoes the Wolff rearrangement, a dehydration-aromatization with a formation of the corresponding aniline, however, the action of the phosphoric acid causes a Beckmann rearrangement with an alpha-beta-unsaturated caprolactam being formed.

This application is a continuation-in-part of my copending application, Serial No. 794,493, filed February 20, 1959, now abandoned.

I claim:

1. A process for preparing 2-cyclohexenone which comprises contacting 4-vinylcyclohexene-4-hydroperoxide with a strongly acidic material having an ionization constant $K_1$ at 25° C. of greater than about $1 \times 10^{-2}$.

2. The process for preparing 2-cyclohexenone which comprises contacting 4-vinylcyclohexene-4 hydroperoxide with a strong mineral acid.

3. The process for preparing 2-cyclohexenone which comprises contacting 4-vinylcyclohexene-4 hydroperoxide with sulfuric acid.

4. The process for preparing 2-cyclohexenone which comprises contacting 4-vinylcyclohexene-4 hydroperoxide with perchloric acid.

5. The process for preparing 2-cyclohexenone which comprises contacting 4-vinylcyclohexene-4 hydroperoxide with a strongly acidic cation exchange resin.

References Cited in the file of this patent

Farmer et al.: J. Chem. Soc. (London), pages 127–28 (1942).

Birch: J. Chem. Soc. (London), pages 593–7 (1946).